United States Patent [19]
Storch

[11] Patent Number: 4,758,294
[45] Date of Patent: Jul. 19, 1988

[54] PROCESS FOR THE PRODUCTION OF A FOAM BACKED ARTICLE

[76] Inventor: Helmut Storch, Am Suedhang 5, 8450 Amberg, Fed. Rep. of Germany

[21] Appl. No.: 106,419

[22] Filed: Oct. 6, 1987

[30] Foreign Application Priority Data

Jul. 10, 1987 [DE] Fed. Rep. of Germany ....... 3722813

[51] Int. Cl.⁴ .......................... B32B 31/12; B32B 5/20
[52] U.S. Cl. ......................................... 156/79; 156/93; 156/212; 156/245; 264/46.5; 264/46.6; 297/DIG. 1; 428/102; 428/317.1
[58] Field of Search .................... 156/79, 93, 212, 245; 264/46.5, 46.6; 297/DIG. 1; 428/317.1, 102

[56] References Cited

U.S. PATENT DOCUMENTS

| | | | |
|---|---|---|---|
| 4,046,611 | 9/1977 | Sanson | 156/79 |
| 4,116,736 | 9/1978 | Sanson et al. | 156/79 |
| 4,247,347 | 1/1981 | Lischer et al. | 156/79 |
| 4,247,348 | 1/1981 | Lischer | 156/79 |
| 4,559,094 | 12/1985 | Hostetler et al. | 156/212 |
| 4,614,558 | 9/1986 | Kobe | 156/212 X |

Primary Examiner—Robert A. Dawson
Attorney, Agent, or Firm—R. Gale Rhodes, Jr.

[57] ABSTRACT

A process for the production of a foam-backed article in which a covering is formed by sewing several parts together along joining seams and the outer side of the cover is laid onto a preliminary mold. A one-piece airtight film is positioned so that it overlies the whole of the covering and is then applied against the film and a peripheral edge portion of the film is sealed against the preliminary mold. The vacuum is applied to the interior of the preliminary mold to pull and bond the film to the inner side of the covering which is thereafter removed, turned inside out, and applied into a thermoforming mold in which the foam backing is formed.

5 Claims, 2 Drawing Sheets

PROCESS FOR THE PRODUCTION OF A FOAM BACKED ARTICLE

FIELD OF THE INVENTION

The invention relates to a process for the production of a foam-backed article, using a vacuum thermoforming process, which article has a covering formed of several parts sewn together along joining seams.

BACKGROUND OF THE INVENTION

In one known process, the covering is laid by its outer side onto a preliminary mold, which is negative to the thermoforming mold, the joining seams subsequently being sealed by adhesion with an airtight film; thereafter the covering is turned inside out, introduced by its outer side into the thermoforming mold and foam-backed.

This process is intended in particular for the production of relatively sharp-edged foam-backed articles, which are provided with a joining seam at least along a part of their edges. In this process, the covering is laid by its outside side onto the preliminary mold in such a way that it comes to rest with a joining seam on an edge of the preliminary mold. The covering which is used in this known process has a lamination. In particular when using leather as covering material, the flame lamination of the covering produces a relatively large amount of waste. A deficient flame lamination of the covering results in its distortion and the formation of folds, which is likewise undesirable. For sealing of the joining seams, in this process an airtight film in the form of a strip is used, which is adhesively affixed along the joining seam onto the two joined covering parts, on the inside of the covering parts. This adhesive affixing of a strip-shaped airtight film requires precise, time-consuming work in order to avoid a deficient seal of the joining seams. A deficient seal of the joining seams results in the foam-producing reaction mixture being able to penetrate the seams during the foam-backing operation. In addition, a deficient seal of the joining seams can also result in an undesirable formation of folds.

A further shortcoming of the known process is that the strip-shaped film adhesively fixed on the laminated covering parts forms a material deposition in the region of the joining seams, on account of which the seam and corner shaping of the cover which is turned inside out after sealing, and of the foam-backed article, leaves something to be desired.

SUMMARY OF THE INVENTION

According the present invention there is provided a process for the production of a foam-backed article, said process comprising the steps of forming a covering from a plurality of covering parts by sewing the parts together along joining seams, the thus formed covering having an inner side and an outer side, laying the outer side of the thus formed covering onto a preliminary mold, positioning a one-piece airtight film so that it overlies the whole of said covering, laying said film onto the inner side of said covering, sealing a peripheral edge portion of said film to said preliminary mold, applying a vacuum to the outer side of said covering while it is laid on said preliminary mold, thereby sucking said film into intimate contact against the whole of the inner side of said covering, bonding said film to the inner side of the covering, removing the covering from the preliminary mold, turning the covering inside out, introducing the covering into a thermo-forming mold cavity, which is the negative of the preliminary mold, so that the outer side of the covering abuts the thermo-forming mold cavity, closing the thermo-forming mold and injecting a foam forming material in the cavity.

With the process of the invention a reliable sealing of the joining seams is ensured without requiring a great deal of time, and the distortion of and formation of folds in the covering is reduced with, at the same time, improved seam and corner shaping.

In the process according to the invention, not only are the joining seams sealed with the airtight film, but the entire covering. As a non-laminated covering can be used with the process according to the invention, not only the distortion caused by such a lamination and the often unavoidable formation of folds in the covering caused by such a lamination are reduced, but the often unavoidable waste caused by such a lamination during the flame lamination is also reduced. An essential advantage is that, with the process according to the invention, an improved seam and corner shaping of the covering is ensured, because the material deposition by the airtight film alone is smaller than in the use of a strip-shaped airtight film which is adhesively fixed on a lamination of the covering.

Advantageously the airtight film is clamped by its edge into a frame, heating the film while mounted on the frame so that the peripheral edge portion of the film abuts and seals against the preliminary mold, whereafter the vacuum is applied. By heating the airtight film, the airtight film becomes softer, so that, with a relatively small vacuum applied to the preliminary mold, the film can be applied closely to the covering on the preliminary mold and can be bonded to the covering. For this purpose, preferably the process uses an airtight film with a hot-melt adhesive coating by which the film is fixed to the inside of the covering.

In order to be able to carry out the process according to the invention with a relatively short production time, the composite of airtight film and covering may be cooled on the inside after fixing of the film. This can be performed for example by an air jet being directed against the composite of film and covering.

After implementation of these process steps, the covering thus prepared is removed from the preliminary mold and turned inside out, so that the airtight film is positioned on the inside of the covering turned inside out, to be foam-backed.

BRIEF DESCRIPTION OF THE DRAWINGS

In order to show the advantage of the invention, the following description is given, of a presently preferred method of carrying out the process of the invention, reference being made to the accompanying drawings.

In the drawings.

DETAILED DESCRIPTION OF PREFERRED EMBODIMENT

Figure 1:
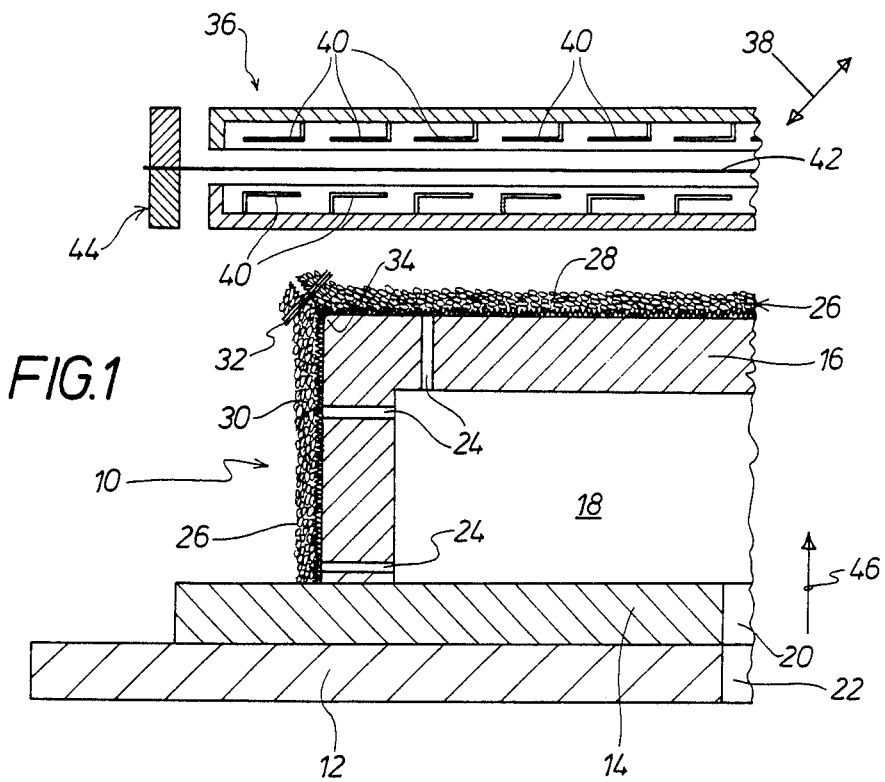
FIG. 1 is a cross-section of a preliminary mold, on which a covering is arranged, and a section of an airtight film arranged in a heating device of one embodiment of process of the invention.

FIG. 1 shows a section of a preliminary mold 10, which has on a table 12 a male mold substructure 14 and, on the male mold substructure 14, a male mold 16. The male mold 16 and the male mold substructure 14 define a central cavity 18, which can be connected to a vacuum pump (not shown) by mutually aligned boreholes 20 and 22 in the male mold substructure 14 and in the table 12. The preliminary mold 10, i.e. the male mold 16 has a contour which is negative to the contour of the thermoforming mold (not shown). This means that a convex formation of the preliminary mold 10 corresponds to a concave formation in the thermoforming mold, and vice versa. The male mold 16 of the preliminary mold 10 is provided with suction holes 24. On the upper side of the male mold 16 is arranged a covering 26, which consists of covering parts 28 and 30, which are joined by a joining seam 32. The covering 26 is arranged on the male mold 16 of the preliminary mold 10 in such a way that it rests by its joining seam 32 on the edge 34 of the male mold 16.

A heating device 36 can be arranged over the preliminary mold 10, movably in the direction of the arrow 38. The heating device 36 is provided with heating elements 40, with the aid of which an air-impermeable film 42 can be heated. The air-impermeable film 42 is tightly clamped by its peripheral edge in a clamping frame 44, which has an inner contour which corresponds to the outer contour of the male mold substructure 14, as can be seen in FIG. 2.

The air-impermeable film 42 is preferably a polyurethane film with a hot-melt adhesive coating. After the heating of the air-impermeable film 42, the preliminary mold 10 is moved in the direction of the arrow 46 relatively toward the air-impermeable film 42. At the same time, the clamping frame 44 is moved toward the preliminary mold 10, until it rests directly against the male mold substructure 14 on the table 12, as can be seen in FIG. 2. Then the air-impermeable film 42 is sucked against the inside of the covering 26 by the central cavity 18 of the preliminary mold 10 being connected to a vacuum pump (not shown). The suction of the air from within the air-impermeable film 42 is indicated by the arrows 48 leaving the suction holes 24 and by the arrow 50. In FIG. 2, four different positions of the air-impermeable film 42 are shown, the situation after completion of the suction operation being that the air-impermeable film 42 rests closely all round against the inside of the covering 26 and the join of the covering parts 28 and 30 with the joining seam 32 also being sealed. Owing to the design of the airtight film 42 with a hot-melt adhesive coating, the film 42 is adhesively fixed on the inside of the covering 26, a formation of folds or a distortion of the covering 26 being avoided in a simple way.

Figure 2:
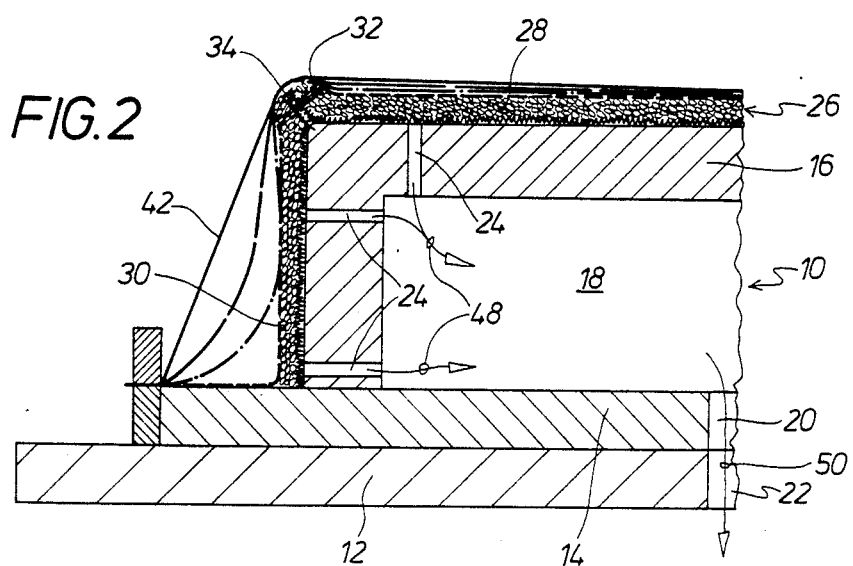
FIG. 2 shows the working step in which the heating device is removed from the air-impermeable film, the air-impermeable film is applied in airtight manner to the preliminary mold and the preliminary mold is evacuated.
Figure 3:
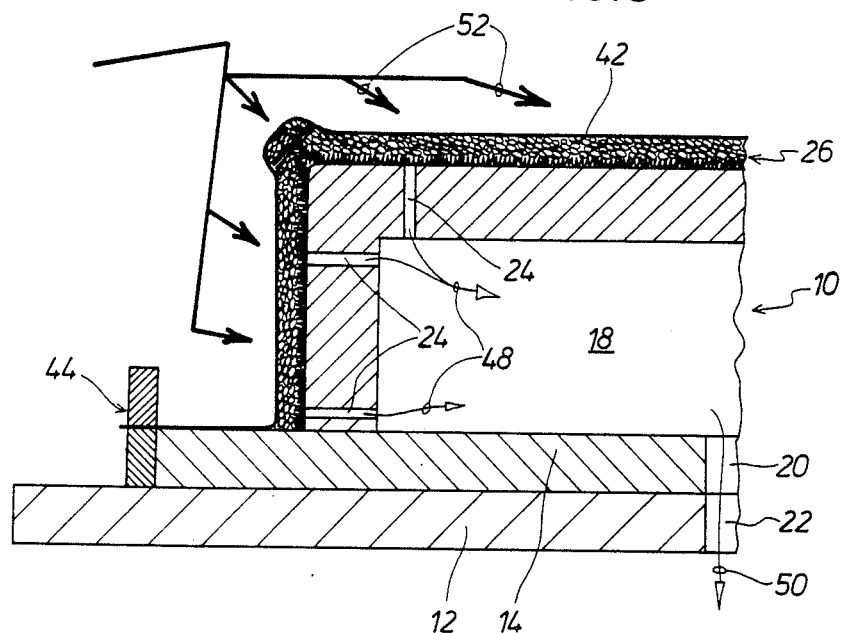
FIG. 3 is a view corresponding to FIG. 2, in which the airtight film is shown applied closely on all sides to the covering and fixed to the covering.
Figure 4:
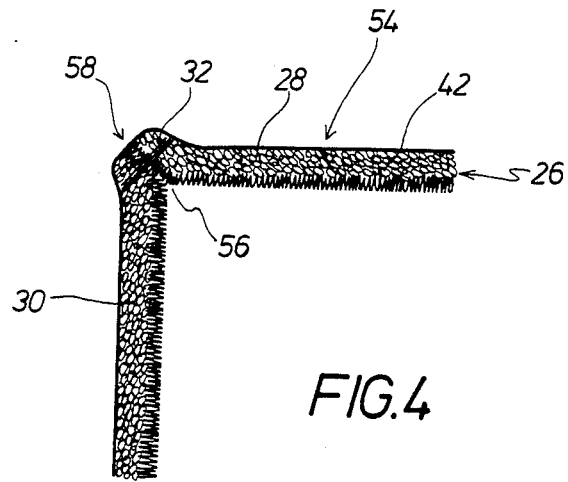
FIG. 4 shows a section of the covering having a joining seam, before being turned inside out.

FIG. 3 diagrammatically represents a working step which follows on from the working step represented in FIG. 2 and in which the composite of air-impermeable film 42 and covering 26 is cooled with cooling air. This cooling is diagrammatically indicated in FIG. 3 by the arrows 52. During this cooling operation, the vacuum in the suction holes 24, the central cavity 18 and the boreholes 20 and 22 is maintained. After the cooling of the composite of air-impermeable film 42 and covering 26, the vacuum is switched off and the composite is removed from the preliminary mold 10. FIG. 4 shows a section of the composite 54 of covering 26 and air-impermeable film 42 fixed on the inside of the covering 26. The composite 54 has an edge 56 corresponding to the edge 34 of the preliminary mold 10 (see FIG. 1), in the vicinity of which edge 56 the joining seam 32 of the covering parts 28 and 30, sections of which are shown, runs. The covering parts 28 and 30 and the joining area of the covering parts 28 and 30 is reliably sealed by the air-impermeable film 42, so that the composite 54 can be turned inside out in a subsequent operation. After the turning inside out of the composite 54, the bead 58 with the joining seam 32 and the air-impermeable film 42 are on the inside, while the covering 26 forms the outside, by which it is placed into a thermoforming mold (not shown). Subsequently, a vacuum is applied to the thermoforming mold and the covering is foam-backed.

I claim:

1. A process for the production of a foam-backed article, said process comprising the steps of forming a covering from a plurality of covering parts by sewing the parts together along joining seams, the thus formed covering having an inner side and an outer side, laying the outer side of the thus formed covering onto a preliminary mold, positioning a one-piece airtight film so that it overlies the whole of said covering, laying said film onto the inner side of said covering, sealing a peripheral edge portion of said film to said preliminary mold, applying a vacuum to the outer side of said covering while it is laid on said preliminary mold, thereby sucking said film into intimate contact against the whole of the inner side of said covering, bonding said film to the inner side of the covering, removing the covering from the preliminary mold, turning the covering inside out, introducing the covering into a thermo-forming mold cavity, which is the negative of the preliminary mold, so that the outer side of the covering abuts the thermo-forming mold cavity, closing the thermo-forming mold and injecting a foam forming material in the cavity.

2. A process according to claim 1, further comprising the steps of clamping the airtight film by its edge into a frame, heating the film while mounted on the frame so that the peripheral edge portion of the film abuts and seals against preliminary mold, whereafter the vacuum is applied.

3. A process as claimed in claim 1, wherein said airtight film is provided with a hot melt adhesive coating on one face, the coating being abutted against the inner side of the covering to bond the film against the covering.

4. A process as claimed in claim 1, and further comprising the step of cooling the composite of the airtight film and the covering after the film has been bonded to the covering.

5. A process as claimed in claim 4, wherein said cooling step is carried out by blowing cold air against the film before the covering is removed from the preliminary mold.

* * * * *